United States Patent
Kaneko et al.

(10) Patent No.: US 12,188,835 B2
(45) Date of Patent: Jan. 7, 2025

(54) LOAD SENSOR ELEMENT AND MANUFACTURING METHOD OF LOAD SENSOR ELEMENT

(71) Applicants: KOA Corporation, Ina (JP); NTN Corporation, Osaka (JP)

(72) Inventors: Homare Kaneko, Ina (JP); Natsumi Shiobara, Ina (JP); Koichi Urano, Ina (JP); Yusuke Shibuya, Iwata (JP); Daichi Kondou, Iwata (JP)

(73) Assignees: KOA Corporation, Nagano (JP); NTN Corporation, Osaka (JP)

( * ) Notice: Subject to any disclaimer, the term of this patent is extended or adjusted under 35 U.S.C. 154(b) by 383 days.

(21) Appl. No.: 17/753,198

(22) PCT Filed: Aug. 19, 2020

(86) PCT No.: PCT/JP2020/031209
§ 371 (c)(1),
(2) Date: Feb. 23, 2022

(87) PCT Pub. No.: WO2021/039517
PCT Pub. Date: Mar. 4, 2021

(65) Prior Publication Data
US 2022/0276105 A1 Sep. 1, 2022

(30) Foreign Application Priority Data
Aug. 28, 2019 (JP) ................. 2019-155589

(51) Int. Cl.
*G01L 1/22* (2006.01)
*G01L 1/20* (2006.01)

(52) U.S. Cl.
CPC ........... *G01L 1/2287* (2013.01); *G01L 1/205* (2013.01); *G01L 1/2218* (2013.01); *G01L 1/2237* (2013.01); *G01L 1/2268* (2013.01)

(58) Field of Classification Search
CPC ..... G01L 1/2218; G01L 1/205; G01L 1/2237; G01L 1/2268; G01L 1/2287
See application file for complete search history.

(56) References Cited

U.S. PATENT DOCUMENTS 4,738,146 A * 4/1988 Baumgartner ............ G01L 1/18
73/862.52
5,222,399 A * 6/1993 Kropp ....................... G01L 1/20
177/210 R
(Continued)

FOREIGN PATENT DOCUMENTS

JP S62220822 A 9/1987
JP H01296130 A 11/1989
(Continued)

OTHER PUBLICATIONS

International Search Report, Application No. PCT/JP2020/031209, mailed Sep. 24, 2020. ISA/Japan Patent Office.

*Primary Examiner* — Benjamin R Schmitt
(74) *Attorney, Agent, or Firm* — Honigman LLP; John Chau; Jonathan P. O'Brien

(57) ABSTRACT

A load sensor element includes a substrate made of a ceramic material; an inorganic layer having a surface configured to receive a load, the inorganic layer covers a portion of the substrate; a thin-layer resistance body whose resistance value changes in accordance with the load received by the inorganic layer, the thin-layer resistance body having a main body portion and a pair of end portions, the main body portion mounted on the covered portion of the substrate and sandwiched between the substrate and the inorganic layer, the pair of end portions mounted on an exposed portion of the substrate, and the exposed portion free of the inorganic layer; and a pair of electrodes electrically connected to the
(Continued)

pair of end portions of the thin-layer resistance body and separated away from the inorganic layer and on one side of the substrate.

11 Claims, 15 Drawing Sheets

(56) References Cited

U.S. PATENT DOCUMENTS

| | | | | |
|---|---|---|---|---|
| 5,948,990 | A | * 9/1999 | Hashida | ............... G01L 1/205 73/725 |
| 2005/0163461 | A1 | * 7/2005 | Ziebart | ............... G01L 1/2287 385/147 |

FOREIGN PATENT DOCUMENTS

| | | |
|---|---|---|
| JP | 2002310813 A | 10/2002 |
| JP | 2015031641 A | 2/2015 |
| WO | 2019151345 A1 | 8/2019 |

* cited by examiner

LOAD SENSOR ELEMENT AND MANUFACTURING METHOD OF LOAD SENSOR ELEMENT

CROSS-REFERENCE TO RELATED APPLICATIONS

This application is the U.S. national stage of PCT/JP2020/031209 filed on Aug. 19, 2020, which claims priority of Japanese Patent Application No. JP 2019-155589 filed on Aug. 28, 2019, the contents of which are incorporated herein.

TECHNICAL FIELD

The present disclosure relates to a load sensor element and a manufacturing method of the load sensor element.

BACKGROUND

JP2002-310813A discloses a load sensor element including a pressure sensitive portion made of a composite material formed by dispersing a pressure resistive material in a ceramic material, a pair of insulating parts made of ceramics and that are provided on both of an upper surface and a lower surface of the pressure sensitive portion, and a pair of electrodes provided on both side surfaces of the pressure sensitive portion.

SUMMARY

However, in the load sensor element described in JP2002-310813A, because the pressure sensitive portion is a sintered body having a certain thickness and that is formed by sintering a compact obtained by compressing a mixed powder obtained by mixing the ceramic material and the pressure resistive material, it is difficult to uniformly disperse the pressure resistive material in the ceramic material in the pressure sensitive portion. Therefore, there is a problem in that a detection accuracy of the load sensor element is deteriorated due to the un-uniformity of the dispersity of the pressure resistive material.

In addition, in the load sensor element described in JP2002-310813A, because the pair of electrodes are provided on both side surfaces of the pressure sensitive portion, a pressing member applying a load to the load sensor element is likely to come into contact with the electrodes. In a case in which the pressing member is made of a metal material, there is also a problem in which short circuiting of the load sensor element is likely to be caused due to a contact between the electrode and the pressing member made of the metal material.

The present disclosure has been conceived in light of the above-described problems, and an object thereof is to provide a load sensor element capable of detecting a load stably and accurately by avoiding the short circuiting and to provide a manufacturing method of the load sensor element.

According to an aspect of the present disclosure, provided is a load sensor element that detect a load, the load sensor element including: a substrate made of a ceramic material or a metal material, the metal material having an insulating layer on its surface; an inorganic layer having a pressure receiving surface configured to receive the load, the inorganic layer being provided so as to cover a part of a single surface of the substrate; a thin-layer resistance body formed of a resistance body whose resistance value is changed in accordance with the load received by the inorganic layer, the thin-layer resistance body having a main body portion and both end portions, the main body portion being sandwiched between the substrate and the inorganic layer, the both end portions being mounted on an exposed portion of the substrate, and the exposed portion of the substrate being not covered with the inorganic layer; and a pair of electrodes electrically connected to the both end portions of the thin-layer resistance body so as to be separated away from the inorganic layer, the electrodes being provided on one side of the substrate.

According to another aspect of the present disclosure, provided is a manufacturing method of the load sensor element configured to detect a load, the manufacturing method including: a step of preparing a substrate layer made of a ceramic material or a metal material, the metal material having an insulating layer on its surface; a step of laying a thin-layer resistivity layer on the substrate layer and laying an electrode layer on the thin-layer resistivity layer; a step of forming a plurality of electrodes by performing a patterning of the electrode layer; a step of forming a plurality of thin-layer resistance bodies by performing a patterning of the thin-layer resistivity layer, the thin-layer resistance bodies having main body portion and both end portions on which the pair of electrodes are to be mounted; a step of forming a load sensor element plate by laying an inorganic layer body such that the plurality of main body portions are covered in such a manner that the inorganic layer body is separated away from the electrodes, the load sensor element plate having a plurality of cell elements on which the pair of electrodes are provided, and the inorganic layer body being formed of a plurality of continuous inorganic layers corresponding to a number of the main body portions; and a step of splitting the load sensor element plate into the plurality of cell elements.

According to these aspects, it is possible to detect the load stably and accurately by avoiding short circuiting.

DETAILED DESCRIPTION OF PREFERRED EMBODIMENTS

In the following, an embodiment of the present disclosure will be described with reference to the attached drawings. In this description, the same reference signs are given to the same components throughout the description.

First Embodiment

Figure 2:
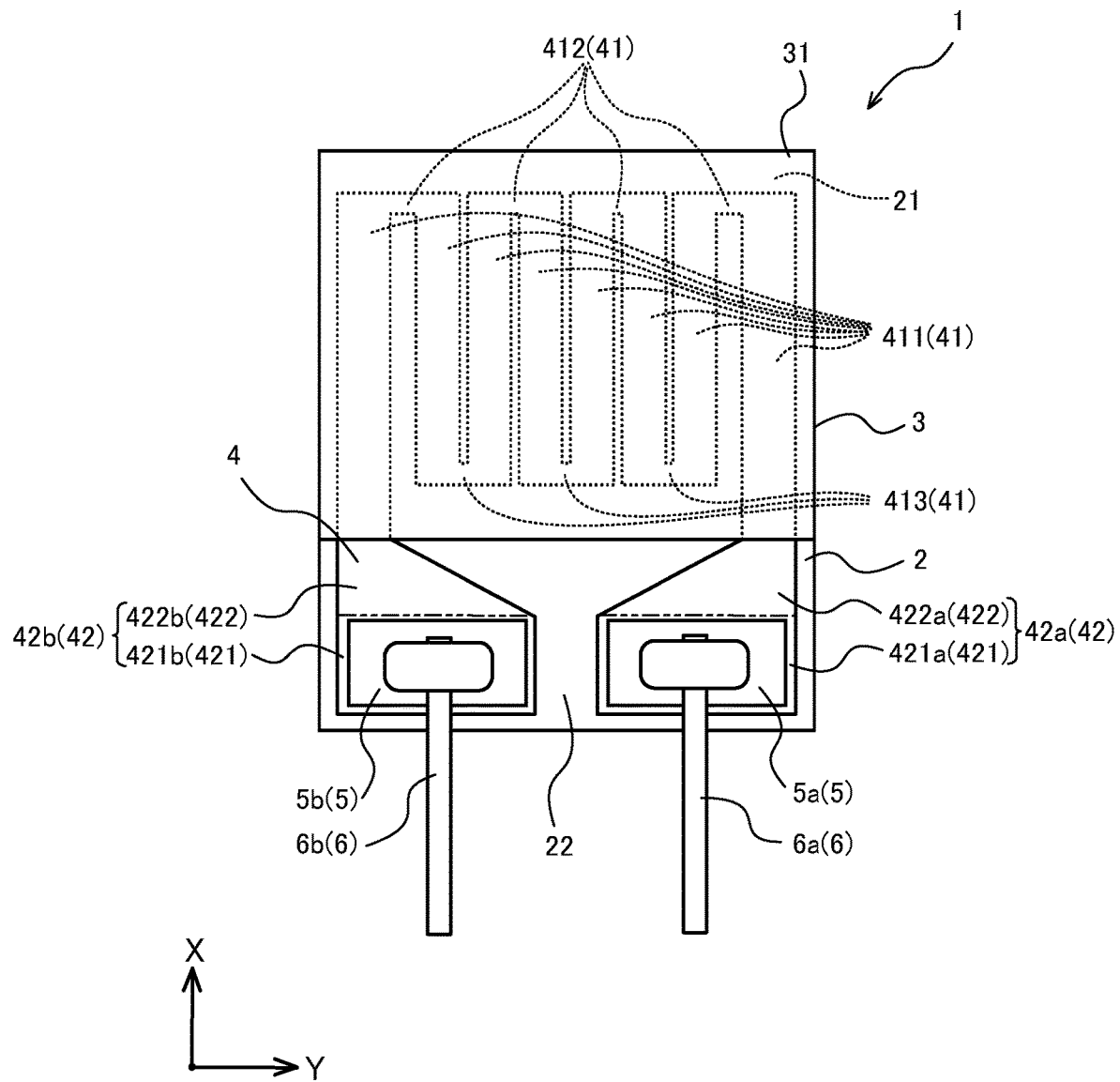
FIG. 2 is a plan view showing the load sensor element according to the first embodiment.
Figure 3:
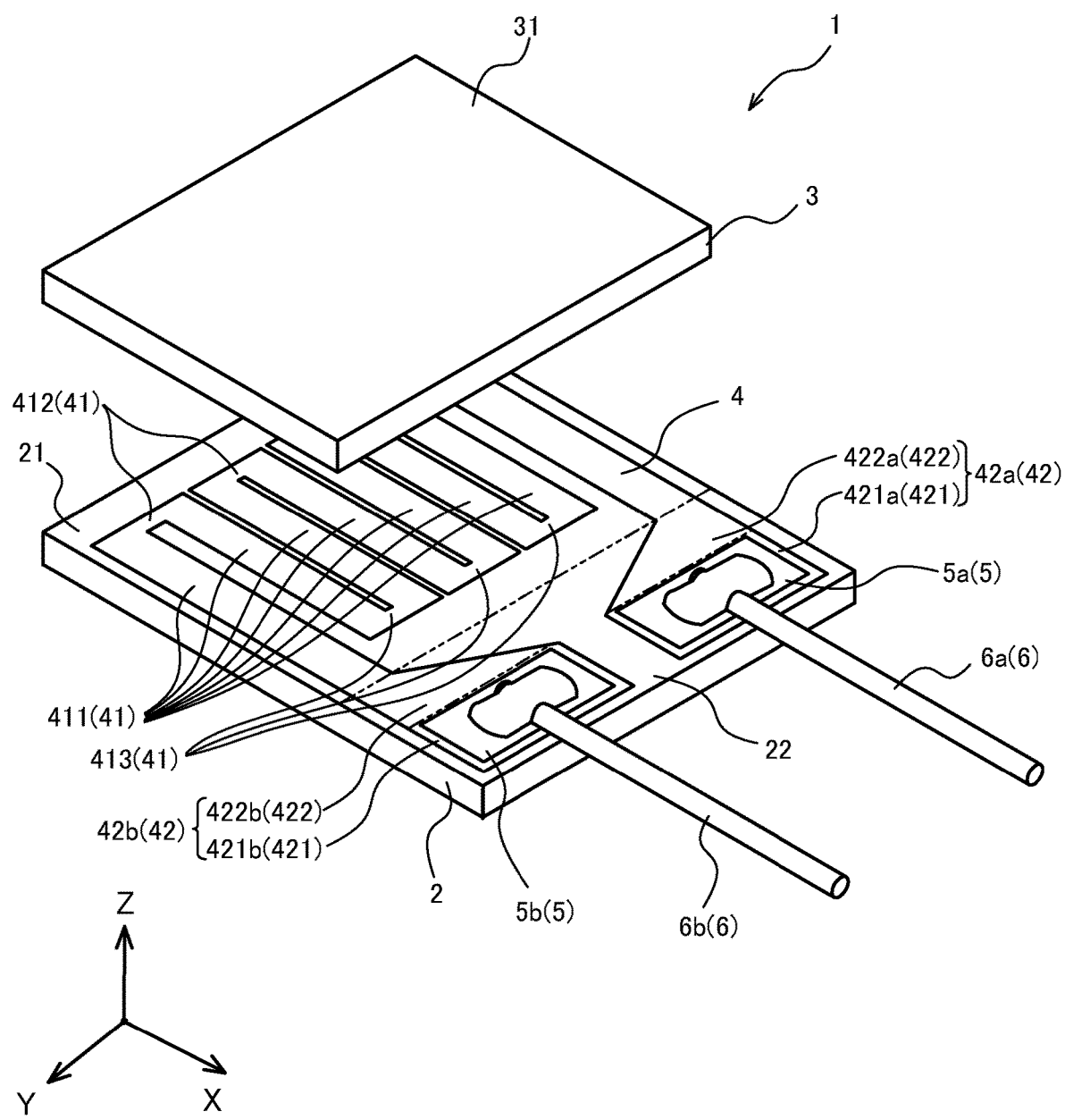
FIG. 3 is an exploded perspective view showing the load sensor element according to the first embodiment.

A load sensor element 1 according to a first embodiment will be described first with reference to FIGS. 1 to 3.

Figure 1:
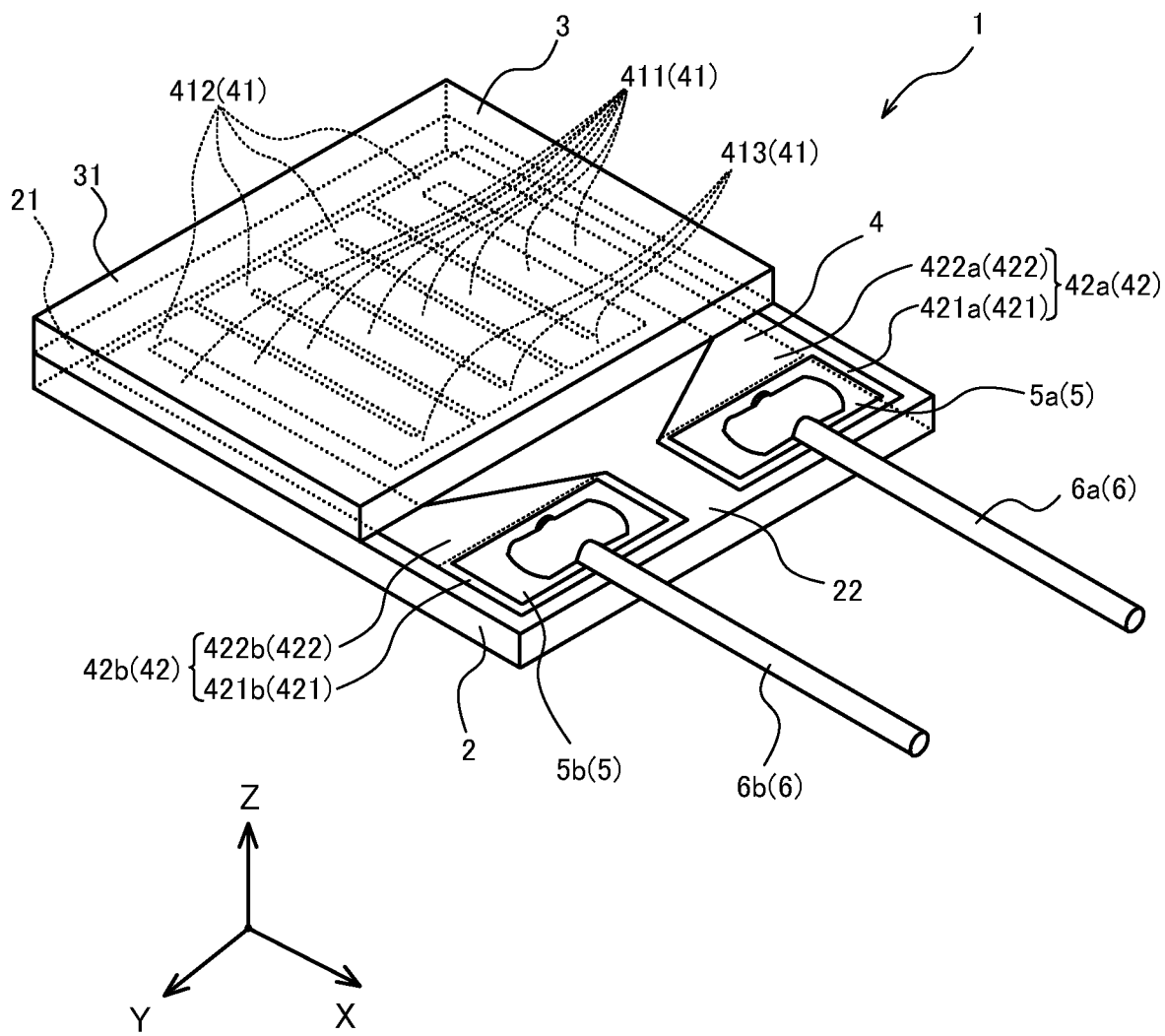
FIG. 1 is a perspective view showing a load sensor element according to a first embodiment.

FIG. 1 is a perspective view showing the load sensor element 1 according to the first embodiment. FIG. 2 is a plan view showing the load sensor element 1 according to the first embodiment. FIG. 3 is an exploded perspective view showing the load sensor element 1 according to the first embodiment. In the drawings, the longitudinal direction, the width direction, and the thickness direction of the load sensor element 1 correspond to the direction along the X axis, the direction along the Y axis, and the direction along the Z axis, respectively. In the following, for the sake of convenience of description, the longitudinal direction, the width direction, and the thickness direction of the load sensor element 1 are simply referred to as the longitudinal direction, the width direction, and the thickness direction, respectively.

Load Sensor Element

The load sensor element 1 according to this embodiment is a sensor element that detects the load applied in the axial direction of a machine tool for the purpose of controlling a pre-load, for example. Specifically, the load sensor element 1 detects the load applied to the load sensor element 1 as a pressing member made of a metal material provided in various devices such as the machine tool, etc. is moved in the thickness direction (the Z axial direction). As shown in FIGS. 1 to 3, the load sensor element 1 is provided with a substrate 2, an inorganic layer 3, a thin-layer resistance body 4, and a pair of electrodes 5 (5a and 5b).

The substrate 2 has a rectangular shape when viewed in a plan view, and is made of, for example, a ceramic material having an insulating property. From the view point of improving a compressive strength of the substrate 2, it is preferable to use zirconia ($ZrO_2$) or alumina ($Al_2O_3$) as a main component of the ceramic material. The substrate 2 made of such materials undergoes little deformation against the applied pressure and has a high rigidity, and therefore, even in a case in which a large load is applied to the load sensor element 1, unlike a resin material substrate, the substrate 2 does not undergo the deformation such as depression and distortion. As a result, the deterioration of the detection accuracy due to the deformation of the substrate 2 is suppressed, and so, the load sensor element 1 can detect the load with high accuracy.

In addition, from the view point of achieving both of the improvement of the compressive strength of the substrate 2 and the reduction in the thickness of the load sensor element 1, it is preferable that the substrate 2 have a thickness of from 0.3 mm to 5.0 mm, inclusive. In a case in which the thickness of the substrate 2 is less than 0.3 mm, the substrate 2 is distorted when the large load is applied to the load sensor element 1, and so, it is not possible to suppress the deterioration of the detection accuracy due to the distortion of the substrate 2. On the other hand, in a case in which the thickness of the substrate 2 exceeds 5.0 mm, even when the large load is applied to the load sensor element 1, the substrate 2 is not distorted, and the load sensor element 1 can detect the large load with high accuracy. However, because the thickness of the substrate 2 is increased accordingly, the reduction in the thickness of the load sensor element 1 as a whole cannot be achieved sufficiently.

An upper surface of the substrate 2 forming the thin-layer resistance body 4 is preferably be subjected to a polishing process such that the flatness thereof becomes 1 μm or less. By doing so, it is possible to form the thin-layer resistance body 4 having the uniform thickness on the upper surface of the substrate 2. As a result, the deterioration of the detection accuracy due to the un-uniformity of the thickness of the thin-layer resistance body 4 is suppressed.

The upper surface of the substrate 2 has a rectangular (including square) covered portion 21 that is covered with the inorganic layer 3 and a rectangular exposed portion 22 that is not covered with the inorganic layer 3. In order to ensure a large area of the thin-layer resistance body 4 (especially, a main body portion 41, which will be described later) that contributes to the detection of the load, the covered portion 21 is formed so as to be larger than the exposed portion 22. On the covered portion 21, the main body portion 41 of the thin-layer resistance body 4 is provided. On the exposed portion 22, the pair of electrodes 5 (5a and 5b) are provided via both end portions 42, which will be described later, of the thin-layer resistance body 4.

The inorganic layer 3 is a pressure receiving portion having a pressure receiving surface 31 that receives the load applied by the pressing member (not shown). In other words, the pressure receiving surface 31 is a back surface of the inorganic layer 3 with respect to the surface thereof facing the substrate 2. Similarly to the substrate 2, the inorganic layer 3 has a rectangular shape (including a square shape) when viewed in a plan view, and is made of, for example, the ceramic substrate having the insulating property. Similarly to the substrate 2, it is preferable to use zirconia ($ZrO_2$) or alumina ($Al_2O_3$) as the main component of the ceramic material. By doing so, even in a case in which the large load is applied to the load sensor element 1, unlike the resin material substrate, the inorganic layer 3 does not undergo the deformation such as depression and distortion. As a result, the deterioration of the detection accuracy due to the deformation of the inorganic layer 3 is suppressed, and so, the load sensor element 1 can detect the load with high accuracy.

From the view point of achieving both of the improvement of the compressive strength of the inorganic layer 3 and the reduction in the thickness of the load sensor element 1, it is preferable that the inorganic layer 3 have a thickness of from 0.3 mm to 5.0 mm, inclusive. In a case in which the thickness of the inorganic layer 3 is less than 0.3 mm, the inorganic layer 3 is distorted when the large load is applied to the load sensor element 1, and so, it is not possible to suppress the deterioration of the detection accuracy due to the distortion of the inorganic layer 3. On the other hand, in a case in which the thickness of the inorganic layer 3 exceeds 5.0 mm, even when the large load is applied to the load sensor element 1, the inorganic layer 3 is not distorted, and the load sensor element 1 can detect the large load with high accuracy. However, because the thickness of the inorganic layer 3 is increased accordingly, the reduction in the thickness of the load sensor element 1 as a whole cannot be achieved sufficiently. Thus, it is possible to achieve both of the improvement of the compressive strength of the inorganic layer 3 and the reduction in the thickness of the load sensor element 1. Although the substrate 2 and the inorganic layer 3 having the same thickness may be used, the substrate 2 and the inorganic layer 3 having different thicknesses may also be used.

The inorganic layer 3 covers a part of a surface of the substrate 2. In other words, the inorganic layer 3 is provided so as to define the covered portion 21 in a region in which the main body portion 41 of the thin-layer resistance body 4 is provided without covering the exposed portion 22 of the substrate 2 where the electrodes 5 (5a and 5b) are provided via the both end portions 42 of the thin-layer resistance body 4. For example, in a case in which the load sensor element is provided with a pressure receiving portion that covers the electrode, etc., there is a risk in that, when the load sensor element receives the load, the electrode is pressed together, and an output signal is varied. On the other hand, in this embodiment, in the load sensor element 1, because the electrode is not provided in the pressure receiving portion that receives the load, such a variation is not caused, and it is possible to detect the load with high accuracy.

The substrate 2 of the load sensor element 1 has the covered portion 21 that is covered with the inorganic layer 3 and the exposed portion 22 that is not covered with the inorganic layer 3. Therefore, the user can easily distinguish the substrate 2 and the inorganic layer 3 and can assemble the load sensor element 1 such that the pressure receiving surface 31 of the inorganic layer 3 faces a tip end of the pressing member. With such a configuration, it is possible to reliably prevent the load sensor element 1 from being accidentally assembled such that the substrate 2 faces the tip end of the pressing member.

From the view point of achieving both of the reduction in load to the main body portion 41 and the improvement of the detection accuracy, the pressure receiving surface 31 of the inorganic layer 3 covering the main body portion 41 preferably has an area from 60 mm$^2$ to 70 mm$^2$, inclusive. When the area falls within this range, the main body portion 41 is less likely to be damaged by the large load (for example, 3.5 kN) and can detect a small load (for example, 3N) with high accuracy.

The inorganic layer 3 is provided over the covered portion 21 of the substrate 2 and the main body portion 41 of the thin-layer resistance body 4 via a bonding layer made of a resin material (not shown). In this embodiment, the bonding layer contains an epoxy resin as a main component.

A lower surface of the inorganic layer 3 facing the thin-layer resistance body 4 is preferably be subjected to the polishing process such that the flatness thereof becomes 1 μm or less. By doing so, it is possible to provide the inorganic layer 3 over the bonding layer with high accuracy.

The thin-layer resistance body 4 is a resistance body whose resistance value is changed corresponding to the load received by the inorganic layer 3. The thin-layer resistance body 4 is made of, for example, nichrome (NiCr) material or chromium (Cr) material. By doing so, because the temperature coefficient of resistance (TCR) is decreased, the load sensor element 1 can detect the load with high accuracy even under a high temperature environment of 50° C. or higher.

In addition, the thin-layer resistance body 4 is a resistive film that is formed on the upper surface of the substrate 2 by a vacuum process such as a vapor deposition, a sputtering, and so forth. As described above, because the uniform resistive film is formed by the vacuum process such as the vapor deposition, the sputtering, and so forth, the un-uniformity of the dispersion of the resistance body is suppressed. Thus, the load sensor element 1 can detect the load with high accuracy.

It is preferable that the thin-layer resistance body 4 be formed to have a thickness of 0 or greater, and 1 μm or less. With such a configuration, the thin-layer resistance body 4 undergoes little depression even in a case in which the large load is applied to the load sensor element 1. Therefore, the deterioration of the detection accuracy due to the depression of the resistance body is suppressed. In addition, the reduction in the thickness of the load sensor element 1 is achieved. The thickness of the thin-layer resistance body 4 is preferably be from 5 nm to 1 μm, inclusive.

The thin-layer resistance body 4 has the main body portion 41 that is mounted on the covered portion 21 of the substrate 2 so as to be sandwiched between the substrate 2 and the inorganic layer 3 and the both end portions 42 that are mounted on the exposed portion 22 of the substrate 2 that is not covered with the inorganic layer 3. It suffices that the inorganic layer 3 does not cover the electrodes 5, and the inorganic layer 3 may cover a part of a one-end-side connecting portion 422a and/or an other-end-side connecting portion 422b, which will be described later. In this embodiment, the boundary portions between the main body portion 41 (a meandering patterned portion) and the connecting portions 422a and 422b substantially coincide with the boundary portion between the covered portion 21 and the exposed portion 22. With such a configuration, it is possible to align the inorganic layer 3 with the boundary portion between the main body portion 41 (the meandering patterned portion) and the connecting portions 422a and 422b, as an installation position of the inorganic layer 3. Therefore, the application of the pressure to an unintended portion of the thin-layer resistance body 4 due to misalignment of the inorganic layer 3 is suppressed, and it is possible to suppress variations in the detection accuracy.

The main body portion 41 is formed to extend in the width direction and to have a substantially line symmetrical shape in substantially the entire area of the covered portion 21 of the substrate 2 (the inorganic layer 3) so as to have a substantially uniform thickness. With such a configuration, the load to be applied to the pressure receiving surface 31 of the inorganic layer 3 is less likely to be distributed unevenly and is likely to be distributed uniformly over the main body portion 41 that is formed to have a meandering shape, and therefore, the load sensor element 1 can detect the load with high accuracy.

Because the main body portion 41 of the thin-layer resistance body 4 sandwiched between the substrate 2 and the inorganic layer 3 is formed to have a resistance body pattern with the meandering shape, it is possible to increase the resistance value of the thin-layer resistance body 4 and to reduce a power consumption of the thin-layer resistance body 4. By changing the pattern shape of the main body portion 41, it is possible to easily design the resistance value of the thin-layer resistance body 4.

In this embodiment, although the main body portion 41 of the thin-layer resistance body 4 is formed to have the meandering pattern shape, the present disclosure is not limited thereto, and it suffices that the main body portion 41 is formed uniformly over the entire area of the covered portion 21 of the substrate 2 (the inorganic layer 3).

In this embodiment, the main body portion 41 has a contour having a substantially rectangular shape. The main body portion 41 has the meandering pattern (the meandering patterned portion), and has a plurality of (for example, eight) extended portions 411 arranged so as extend in the longitudinal direction, a plurality of (for example, four) one-end-side connecting portions 412 that respectively connect one ends of the extended portions 411 that are adjacent with each other, and a plurality of (for example, three) other-end-side connecting portions 413 that respectively connect other ends of the extended portions 411 that are adjacent with each other.

The plurality of extended portions 411 each has a predetermined width and are arranged at a predetermined intervals in the width direction. The plurality of one-end-side connecting portions 412 and the plurality of other-end-side connecting portions 413 are provided alternately in the width direction. By changing the widths of the extended portions 411, it is possible to easily design the resistance value of the thin-layer resistance body 4.

The both end portions 42 are formed of a one-end portion 42a and an other-end portion 42b forming a pair. The one-end portion 42a and the other-end portion 42b are provided so as to be separated away from each other. With such a configuration, the short circuiting due to the contact between the one-end portion 42a and the other-end portion 42b is suppressed.

The one-end portion 42a has: a rectangular one-end-side electrode connecting portion 421a serving as electrode connecting portion 421 on which the electrode 5a is provided; and the one-end-side connecting portion 422a serving as the connecting portion 422 that connects the one end of the main body portion 41 with the one-end-side electrode connecting portion 421a.

Similarly, the other-end portion 42b has: a rectangular other-end-side electrode connecting portion 421b serving as the electrode connecting portion 421 on which the electrode 5b is provided; and the other-end-side connecting portion 422b serving as the connecting portion 422 that connects the other end of the main body portion 41 with the other-end-side electrode connecting portion 421b.

With such a configuration, it is possible to provide the electrode connecting portions 421 on the exposed portion 22 of the substrate 2 so as to be separated away from the inorganic layer 3. As a result, the pair of electrodes 5a and 5b are respectively provided on the electrode connecting portions 421a and 421b so as to be separated away from the inorganic layer 3. In other words, a surface area of the substrate 2 is divided into two parts, the inorganic layer 3 and the exposed portion 22, and both of the electrodes 5a and 5b are provided together in the one part of the substrate 2 formed as the exposed portion 22. The electrodes 5a and 5b are formed on the one surface of the substrate 2, which is the same surface as the surface on which the thin-layer resistance body 4 is formed. Therefore, when the pressing member applies the load to the inorganic layer 3, the contact with the electrodes 5 can be avoided, and so, the short circuiting and the damage of the load sensor element 1 due to the contact between the electrodes 5a and 5b and the pressing member is avoided.

The one-end-side electrode connecting portion 421a is provided such that the width thereof is wider than that of each of the extended portions 411 forming the main body portion 41. Similarly, the other-end-side electrode connecting portion 421b is provided such that the width thereof is wider than that of each of the extended portions 411 forming the main body portion 41. As described above, by forming the electrode connecting portions 421 (421a and 421b) so as to have the wide width, it is possible to make the resistance value of the both end portions 42 (42a and 42b) smaller than the resistance value of the main body portion 41 having the meandering pattern.

The one-end-side connecting portion 422a is formed to have a tapered shape in which the width of the one-end-side connecting portion 422a is gradually increased from the extended portions 411 side towards the one-end-side electrode connecting portion 421a side. Similarly, the other-end-side connecting portion 422b is formed to have a tapered shape in which the width of the other-end-side connecting portion 422b is gradually increased from the extended portions 411 side towards the other-end-side electrode connecting portion 421b side.

By mounting the inorganic layer 3 in the region of the covered portion 21 of the substrate 2 by taking boundary lines between the extended portions 411 and the connecting portions 422 (422a and 422b) having the tapered shape as guide marks, the inorganic layer 3 is prevented from being provided to accidentally cover the region of the exposed portion 22 of the substrate 2.

The pair of electrodes 5 (5a and 5b) are provided so as to be electrically connected to the both end portions 42 (42a and 42b) of the thin-layer resistance body 4 so as to be separated away from the inorganic layer 3. The pair of electrodes 5 (5a and 5b) are each made of, for example, materials such as copper (Cu), silver (Ag), gold (Au), and so forth.

Specifically, the pair of electrodes 5 (5a and 5b) are provided on the connecting portions 422 (422a, 422b) of the both end portions 42 (42a, 42b) that are separated away from the inorganic layer 3. With such a configuration, it is possible to provide the pair of electrodes 5 (5a and 5b) so as to be separated away from the inorganic layer 3.

The pair of electrodes 5 (5a and 5b) may be attached with a pair of external connecting terminals so as to be electrically connected. The external connecting terminals are lead wires 6 (6a and 6b). Specifically, a pair of lead wires 6a and 6b are attached onto the pair of electrodes 5a and 5b, respectively, by soldering. The pair of lead wires 6 are each made of, for example, materials such as copper (Cu), etc. The external connecting terminals are each a wiring capable of transmitting the output signal from the load sensor element 1 to a processing device regardless of the form of the wiring, and the wiring includes a covered wire, a lead frame, and so forth in addition to the lead wires.

Manufacturing Method of Load Sensor Element

Next, a manufacturing method of the load sensor element 1 will be described with reference to FIGS. 3 to 11.

Figure 4:
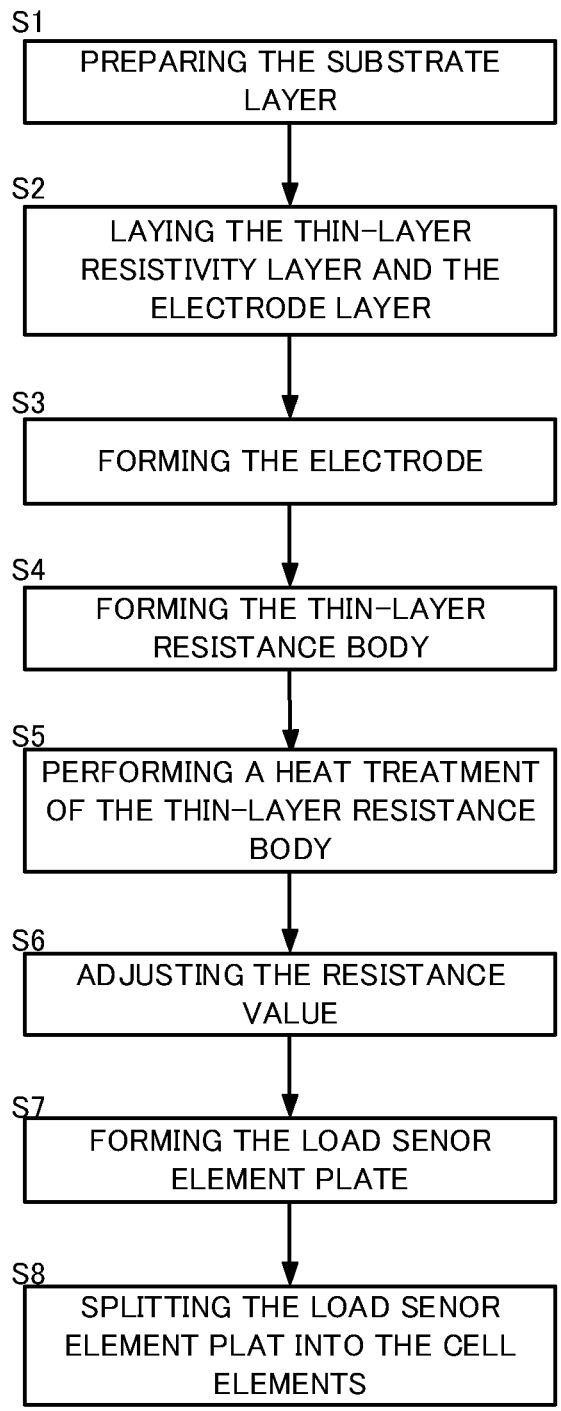
FIG. 4 is a flow chart showing a manufacturing method of the load sensor element according to the first embodiment.
Figure 5:
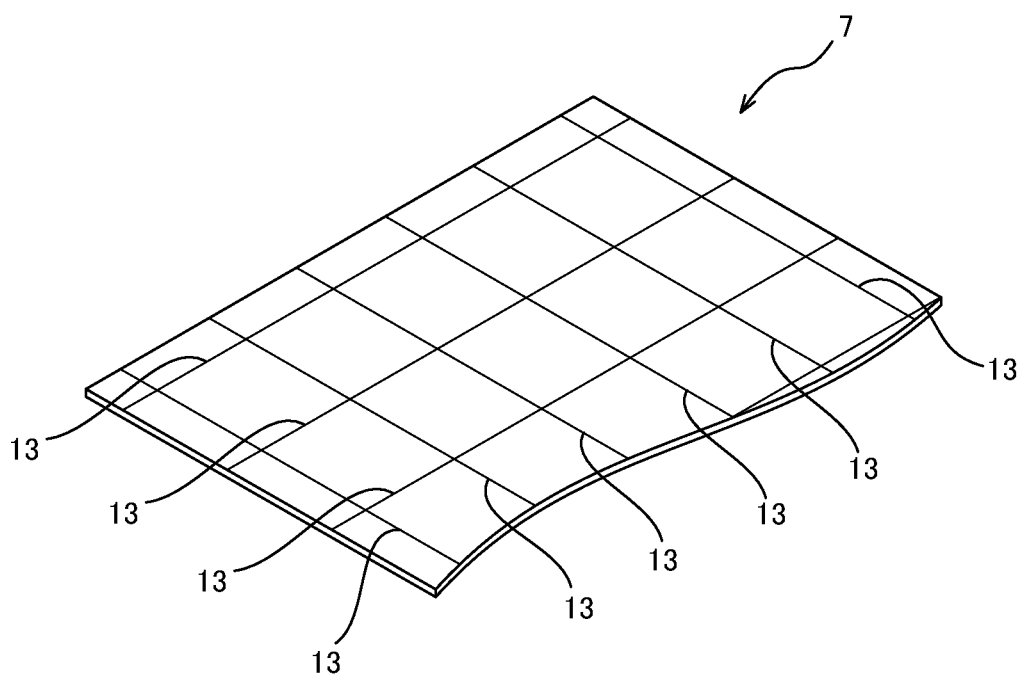
FIG. 5 is a schematic view showing a preparation step of a substrate layer.
Figure 6:
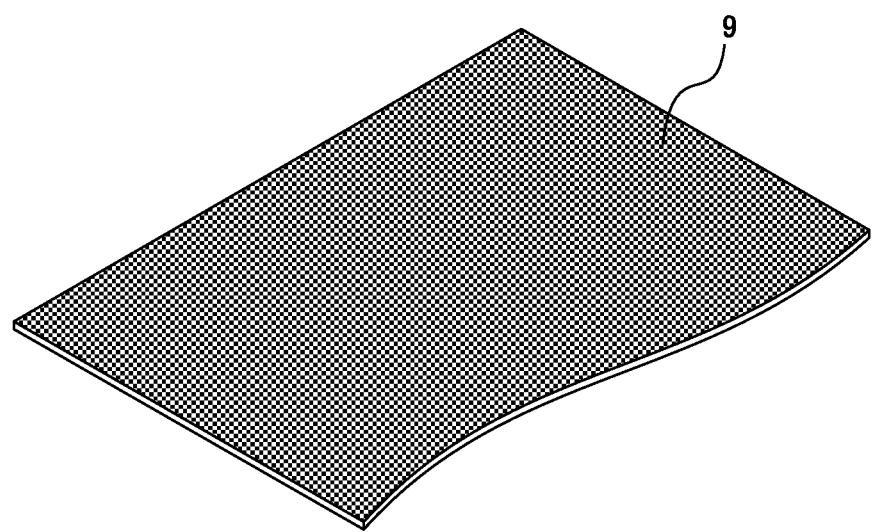
FIG. 6 is a schematic view showing a laying step of a thin-layer resistivity layer and an electrode layer.
Figure 7:
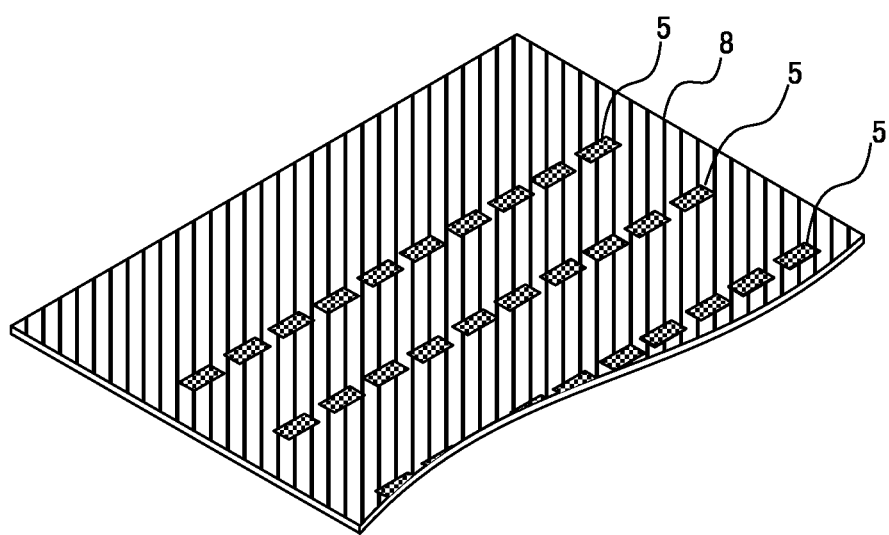
FIG. 7 is a schematic view showing a forming step of electrodes.
Figure 8:
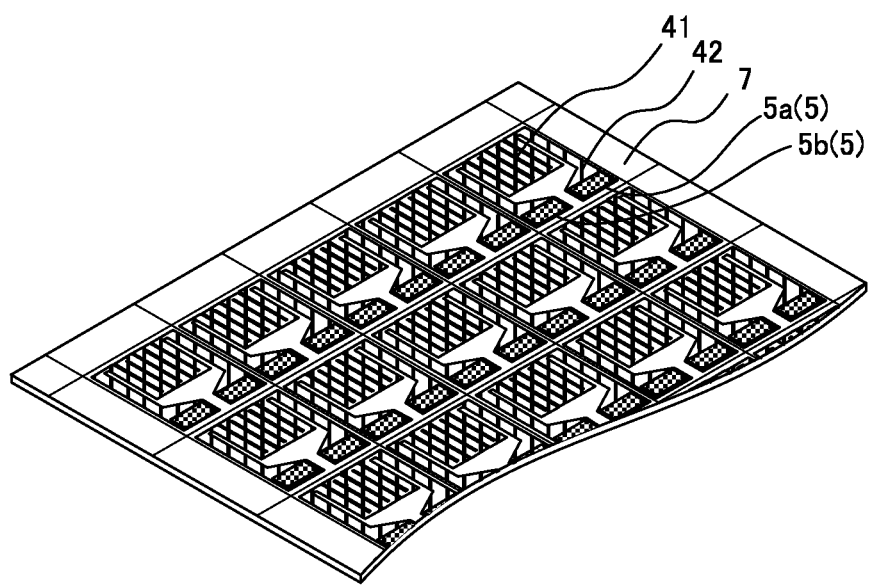
FIG. 8 is a schematic view showing a forming step of a thin-layer resistance body.
Figure 9:
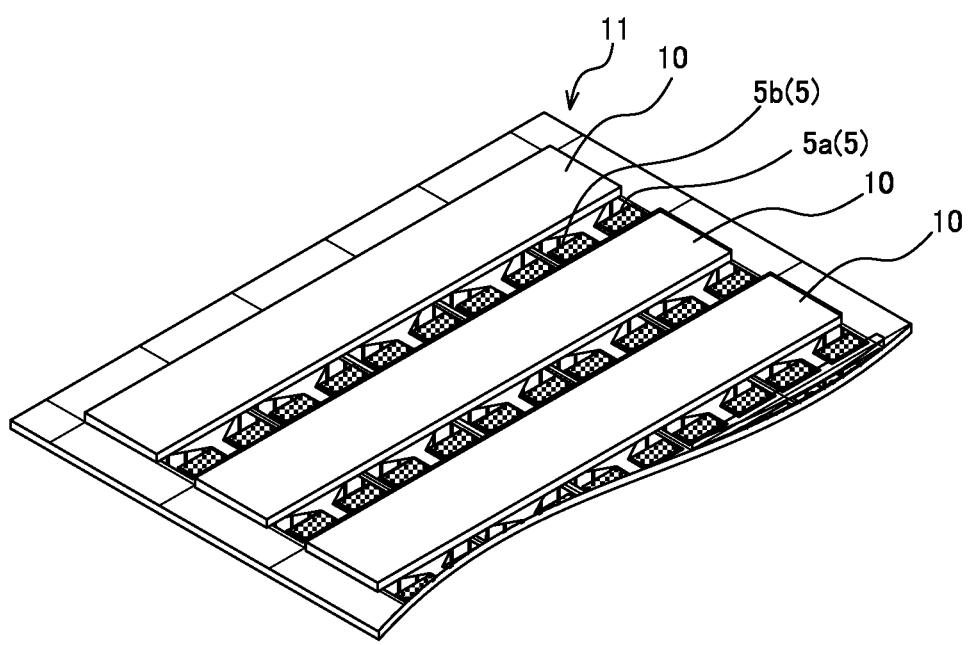
FIG. 9 is a schematic view showing a forming step of a load sensor element plate.
Figure 10:
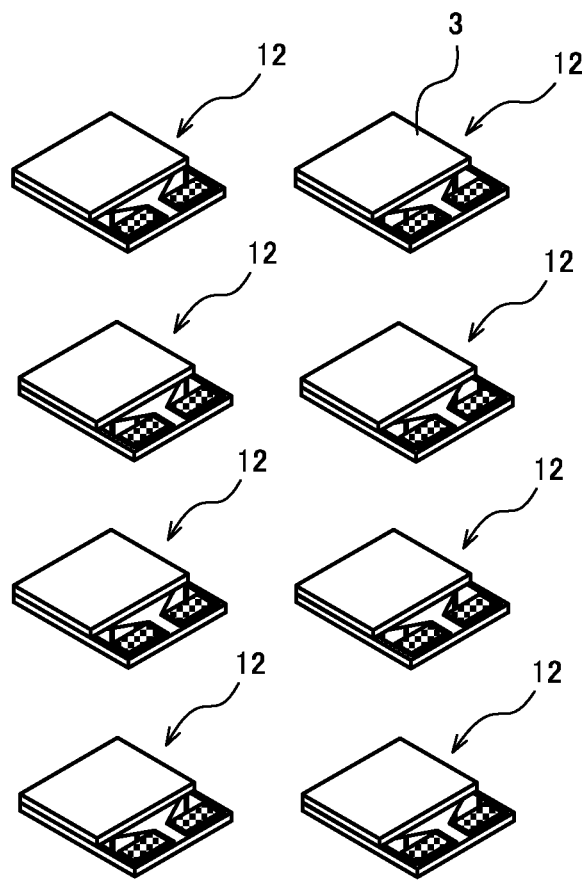
FIG. 10 is a schematic view showing a splitting step of cell elements.
Figure 11:
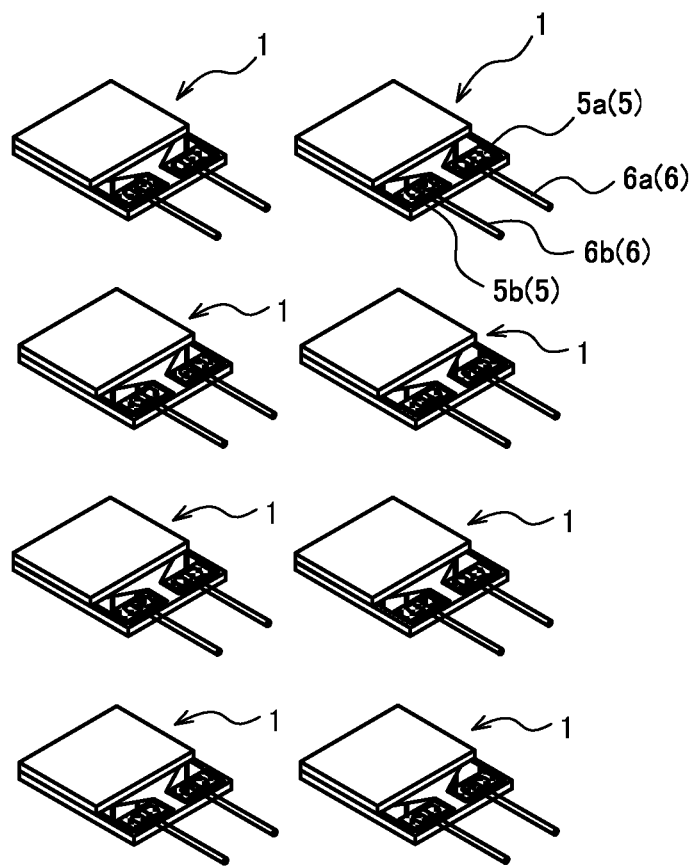
FIG. 11 is a schematic view showing an attachment step of lead wires.

FIG. 4 is a flow chart showing the manufacturing method of the load sensor element 1. FIG. 5 is a schematic view showing a preparation step of a substrate layer 7. FIG. 6 is a schematic view showing a laying step of a thin-layer resistivity layer 8 and an electrode layer 9. FIG. 7 is a schematic view showing a forming step of the electrodes 5. FIG. 8 is a schematic view showing a forming step of the thin-layer resistance body 4. FIG. 9 is a schematic view showing a forming step of a load sensor element plate 11. FIG. 10 is a schematic view showing a splitting step of cell elements 12. FIG. 11 is a schematic view showing an attachment step of the lead wires 6.

As shown in FIG. 4, the manufacturing method of the load sensor element 1 includes: Step S1 for preparing the substrate layer; Step S2 for laying the thin-layer resistivity layer and the electrode layer; Step S3 for forming the electrode; Step S4 for forming the thin-layer resistance body; Step S5 for performing a heat treatment of the thin-layer resistance body; Step S6 for adjusting the resistance value of the thin-layer resistance body; Step S7 for forming the load sensor element plate; and Step S8 for splitting the load sensor element plate into the cell elements, and these steps are performed in this order.

As shown in FIG. 5, in Step S1, the substrate layer 7 made of the ceramic material is prepared. Specifically, in Step S1, an upper surface of the large-sized rectangular substrate layer 7 including a plurality of rectangular substrates 2 is polished such that the flatness becomes 1 µm or less. Subsequently, in order to be ready for a cell-element splitting in Step S8, splitting grooves 13 are formed in the substrate layer 7 such that the plurality of cell elements 12 are formed in the substrate layer 7 (see FIG. 10).

In this embodiment, although the splitting grooves 13 are formed in the substrate layer 7, the present disclosure is not limited thereto, and for example, splitting marks may be formed, or the splitting grooves 13 may not be formed.

Next, as shown in FIG. 6, in Step S2, the thin-layer resistivity layer 8 (see FIG. 7) made of a nichrome (NiCr) material and the electrode layer 9 made of copper (Cu) are laid (layered) on the substrate layer 7 in this order. Specifically, in Step S2, the thin-layer resistivity layer 8 made of the nichrome (NiCr) material is laid uniformly on the upper surface of the substrate layer 7 by a sputtering process, and the electrode layer 9 made of copper (Cu) is laid uniformly on the upper surface of the thin-layer resistivity layer 8 by the sputtering process.

Next, as shown in FIG. 7, in Step S3, by performing the patterning of the electrode layer 9, the plurality of electrodes 5 are formed. Specifically, in Step S3, a photoresist is applied to the electrode layer 9 and dried, and subsequently, a patterning of the electrode layer 9 is performed such that the plurality of electrodes 5 are obtained, and the photoresist is covered with a masking material (a photomask) such that the photoresist remains in the patterned shape (in the pattern of the electrodes 5). Then, by irradiating the UV light, etc. to the exposed portions of the photoresist that are not covered with the masking material, the portions of the photoresist that are not covered with the masking material are subjected to the exposure. Subsequently, the photoresist that has been subjected to the exposure is removed by an alkaline solution, and thereby, the electrode layer 9 that is not covered with the masking material is removed by an etching process. By removing the remaining photoresist, the plurality of electrodes 5 are formed.

Next, as shown in FIG. 8, in Step S4, similarly to Step S3, by performing the patterning of the thin-layer resistivity layer 8 (see FIG. 7), the plurality of thin-layer resistance bodies 4 are formed. Specifically, in Step S4, the photoresist is applied to the thin-layer resistivity layer 8 and dried, and subsequently, the patterning of the thin-layer resistivity layer 8 is performed such that the plurality of thin-layer resistance bodies 4 are obtained, and the photoresist is covered with the masking material (the photomask) such that the photoresist remains in the patterned shape (in the pattern of the thin-layer resistivity layer 8 and of the electrodes 5). Then, by irradiating the UV light, etc. to the exposed portions of the photoresist that are not covered with the masking material, the portions of the photoresist that are not covered with the masking material are subjected to the exposure. Subsequently, the photoresist that has been subjected to the exposure is removed by the alkaline solution, and thereby, the thin-layer resistivity layer 8 that is not covered with the masking material is removed by the etching process. By removing the remaining photoresist, the plurality of thin-layer resistance bodies 4 each having the main body portion 41 and the both end portions 42 on which the pair of electrodes 5 (5a and 5b) are mounted are formed.

Next, in Step S5, the heat treatment of the thin-layer resistance body 4 is performed. By doing so, it is possible to achieve stabilization of the thin-layer resistance body 4. As a result, the load sensor element 1 can detect the load with high accuracy even under a high temperature environment of 50° C. or higher.

Next, in Step S6, the resistance value of the thin-layer resistance body 4 is adjusted. Specifically, in Step S6, the resistance value between the pair of electrodes 5a and 5b is detected, the main body portion 41 of the thin-layer resistance body 4 is cut by a laser, etc. such that a predetermined resistance value is obtained, and a trimming process is performed, and thereby, the resistance value of the thin-layer resistance body 4 is adjusted. This Step S6 is not an essential step, and it may not be performed.

Next, as shown in FIG. 9, in Step S7, by laying an inorganic layer body 10 via the bonding layer (not shown), the load sensor element plate 11 having the plurality of cell elements 12 (see FIG. 10) is formed. Specifically, in Step S7, the load sensor element plate 11 having the plurality of cell elements 12 each provided with the pair of electrodes 5 (5a and 5b) is formed by laying a plurality of inorganic layer pieces 10 serving as the inorganic layer body such that the plurality of main body portions 41 are covered in such a manner that the inorganic layer pieces 10 are separated away from the electrodes 5. Here, the inorganic layer body is formed of the plurality of inorganic layers 3, the number of which corresponds to the number of the main body portions 41 (see FIG. 10), are joined in a continuous manner.

Next, as shown in FIG. 10, in Step S8, the load sensor element plate 11 (see FIG. 9) is split into the plurality of cell elements 12. Specifically, in Step S8, the load sensor element plate 11 is split into the plurality of cell elements 12 by a dicing blade, the laser, and so forth along the splitting grooves 13 (see FIG. 1) formed in advance.

In addition, as shown in FIG. 11, the pair of lead wires 6a and 6b made of copper (Cu) may be attached to each of the cell elements 12 split in Step S8 (FIG. 10). Specifically, the pair of lead wires 6a and 6b are respectively attached by the soldering to the pair of electrodes 5a and 5b in each of the cell elements 12 split in Step S8. By doing so, the plurality of load sensor elements 1 are formed.

Next, operational advantages according to this embodiment will be described.

As described above, the load sensor element 1 according to this embodiment detects the load, and the load sensor element 1 comprises: the substrate 2 made of the ceramic material; the inorganic layer 3 having the pressure receiving surface 31 configured to receive the load, the inorganic layer 3 being provided so as to cover the covered portion 21 on the upper surface of the substrate 2; the thin-layer resistance body 4 formed of a resistance body whose resistance value is changed in accordance with the load received by the inorganic layer 3, the thin-layer resistance body 4 having the main body portion 41 and the both end portions 42 (42a and 42b), the main body portion 41 being sandwiched between the substrate 2 and the inorganic layer 3; the both end portions 42 (42a and 42b) being mounted on the exposed portions 22 of the substrate 2, and the exposed portions 22 of the substrate 2 being not covered with the inorganic layer 3; and the pair of electrodes 5 electrically connected to the both end portions 42 (42a and 42b) of the thin-layer resistance body 4 so as to be separated away from the inorganic layer 3, the pair of electrodes 5 being provided on the one side of the substrate 2.

With such a configuration, because the substrate 2 is made of the ceramic material, even in a case in which the large load is applied to the load sensor element 1, unlike the resin material substrate, the substrate 2 does not undergo the deformation such as depression and distortion. As a result, the deterioration of the detection accuracy due to the deformation of the substrate 2 is suppressed, and the load sensor element 1 can detect such a large load with high accuracy.

Furthermore, because the inorganic layer 3 is not provided over an entire area of the upper surface of the substrate 2, but is provided so as to cover the covered portion 21 on the upper surface of the substrate 2, the user can easily distinguish the substrate 2 and the inorganic layer 3 and can assemble the load sensor element 1 such that the pressure receiving surface 31 of the inorganic layer 3 faces the pressing member.

As the resistance body whose resistance value is changed in accordance with the load received by the inorganic layer 3, the thin-layer resistance body 4 having the uniform thickness that is formed by the vacuum process such as the vapor deposition, the sputtering, and so forth is used, and therefore, the un-uniformity of the dispersity of the resistance body is suppressed. Thus, the load sensor element 1 can detect the load with high accuracy.

The thin-layer resistance body 4 has: the main body portion 41 that is mounted on the covered portion 21 on the single surface of the substrate 2 so as to be sandwiched between the substrate 2 and the inorganic layer 3; and the both end portions 42 (42a and 42b) that are mounted on the exposed portion 22 on the single surface of the substrate 2 that is not covered with the inorganic layer 3. In other words, the inorganic layer 3 does not covers the exposed portion 22 of the substrate 2 on which the both end portions 42 (42a and 42b) of the thin-layer resistance body 4 are provided and only covers the covered portion 21 of the substrate 2 on which the main body portion 41 of the thin-layer resistance body 4 is provided. With such a configuration, compared with the load sensor element having the pressure receiving portion covering the electrode, etc., the load sensor element 1 can detect the load with higher accuracy without detecting undesired signals.

Because the pair of electrodes 5 are provided so as to be electrically connected to the both end portions 42 (42a and 42b) of the thin-layer resistance body 4 so as to be separated away from the inorganic layer 3, the contact between the electrodes 5 (5a and 5b) and the pressing member applying the load to the inorganic layer 3 is reliably avoided, and thus, the short circuiting in the load sensor element 1 due to the contact between the electrodes 5 (5a and 5b) and the pressing member is avoided.

As described above, with the load sensor element 1 according to this embodiment, it is possible to detect the load stably and with high accuracy by avoiding occurrence of the short circuiting.

In addition, in this embodiment, the inorganic layer 3 is made of the ceramic substrate, the inorganic layer 3 being provided on the main body portion 41 via the bonding layer.

According to such a configuration, because the inorganic layer 3 provided on the main body portion 41 via a contact layer is made of the ceramic substrate, even in a case in which the large load is applied to the load sensor element 1, unlike the resin material substrate, the inorganic layer 3 does not undergo the deformation such as depression and distortion. As a result, the deterioration of the detection accuracy due to the deformation of the inorganic layer 3 is suppressed, and so, the load sensor element 1 can detect such a large load with high accuracy.

In addition, in this embodiment, the thickness of the substrate 2 is from 0.3 mm to 5.0 mm, inclusive.

According to such a configuration, by controlling the thickness of the substrate 2 to be from 0.3 mm to 5.0 mm, inclusive, it is possible to achieve both of the improvement of the compressive strength of the substrate 2 and the reduction in the thickness of the load sensor element 1.

In addition, in this embodiment, the thin-layer resistance body 4 is made of the NiCr material or the Cr material.

According to such a configuration, because the temperature coefficient of resistance is reduced, the load sensor element 1 can detect the load with high accuracy even under a high temperature environment of 50° C. or higher.

In addition, in this embodiment, the thickness of the thin-layer resistance body 4 is greater than 0 and 1 μm or less.

According to such a configuration, by controlling the thickness of the thin-layer resistance body 4 to be greater than 0 and 1 μm or less, the thin-layer resistance body 4 undergoes little depression even in a case in which the large load is applied to the load sensor element 1, and therefore, the deterioration of the detection accuracy due to the depression of the resistance body is suppressed. In addition, the reduction in the thickness of the load sensor element 1 can be further achieved.

In addition, in this embodiment, the main body portion 41 is formed to have the pattern with the meandering shape (the meandering patterned portion).

According to such a configuration, because the main body portion 41 whose resistance value is changed in accordance with the load received by the inorganic layer 3 is formed of the meandering patterned portion, it is possible to increase the resistance value of the thin-layer resistance body 4 and to reduce the power consumption of the thin-layer resistance body 4. In addition, by changing the pattern of the meandering patterned portion, the resistance value of the thin-layer resistance body 4 is easily adjusted.

In addition, in this embodiment, the both end portions 42 (42a and 42b) have the electrode connecting portions 421 (421a and 421b) on which the pair of electrodes 5 are provided; and the connecting portions 422 (422a and 422b) configured to connect the main body portion 41 with the electrode connecting portions 421 (421a and 421b).

According to such a configuration, because the both end portions 42 (42a and 42b) have the electrode connecting portions 421 (421a and 421b) on which the pair of electrodes 5 (5a and 5b) are respectively provided; and the connecting portions 422 (422a and 422b) that respectively connect the main body portion 41 with the electrode connecting portions 421, it is possible to provide the electrode connecting portions 421 (421a and 421b) in the exposed portion 22 of the substrate 2 so as to be separated away from the inorganic layer 3. As a result, because the pair of electrodes 5 (5a and 5b) are respectively provided on the electrode connecting portions 421 (421a and 421b) so as to be separated away from the inorganic layer 3, the contact between the electrodes 5 (5a and 5b) and the pressing member applying the load to the inorganic layer 3 is reliably avoided, and thus, the short circuiting and the damage of the load sensor element 1 due to the contact between the electrodes 5 (5a and 5b) and the pressing member is avoided.

On the other hand, the manufacturing method of the load sensor element 1 according to this embodiment includes: the step of preparing the substrate layer 7 made of the ceramic material; the step of laying the thin-layer resistivity layer 8 on the substrate layer 7 and laying the electrode layer 9 on the thin-layer resistivity layer 8; the step of forming the a plurality of electrodes 5 by performing the patterning of the electrode layer 9; the step of forming the plurality of thin-layer resistance bodies 4 by performing the patterning of the thin-layer resistivity layer 8, the thin-layer resistance bodies 4 having the main body portion 41 with the meandering shape and the both end portions 42 on which the pair of electrodes 5 (5a and 5b) are mounted; a step of forming the load sensor element plate 11 by laying the inorganic layer body 10 such that the plurality of main body portions 41 are covered in such a manner that the inorganic layer body 10 is separated away from the electrodes 5, the load sensor element plate 11 having the plurality of cell elements 12 on which the pair of electrodes 5 (5a and 5b) are provided, and the inorganic layer body 10 being formed of the plurality of continuous inorganic layers 3 corresponding to the number of the main body portions 41; and a step of splitting the load sensor element plate 11 into the plurality of cell elements 12.

According to such a configuration, it is possible to manufacture the load sensor element 1 capable of detecting the load stably and with high accuracy by avoiding the short circuiting and the damage of the electrodes 5.

Modification of First Embodiment

In the above-mentioned embodiment, although the substrate 2 is made of the ceramic material, the present disclosure is not limited thereto, and the substrate 2 may be made of, for example, a metal material, etc. In this case, it is required to form an insulating layer on the single surface (the upper surface) of the substrate 2 forming the thin-layer resistance body 4 by performing an insulating process (a metal oxide, the insulating material is provided by a coating, etc.).

According to such a configuration, because the substrate 2 is made of the metal material, compared with a case in which the substrate 2 is made of the ceramic material, an operational advantage is afforded in that a good processability is achieved.

In addition, in the above-mentioned embodiment, although, similarly to the substrate 2, the inorganic layer 3 is made of the ceramic substrate, the present disclosure is not limited thereto, and the inorganic layer 3 may be made of, for example, an alumina protection film. In this case, the uniform alumina protection film is directly formed on the thin-layer resistance body 4 by the vacuum process such as the vapor deposition, the sputtering, and so forth without forming the intervening bonding layer.

According to such a configuration, because the inorganic layer 3 is made of the alumina protection film, it is possible to omit the bonding layer intervened between the thin-layer resistance body 4 and the inorganic layer 3. With such a configuration, when the large load is applied to the load sensor element 1, the deterioration of the detection accuracy due to the depression of the bonding layer is suppressed. In addition, the reduction in the thickness of the load sensor element 1 is achieved.

In this modification, the alumina protection film is formed such that its thickness is at least 3 µm, but thinner than the thickness of the substrate 2.

According to such a configuration, by controlling the thickness of the alumina protection film to be at least 3 µm, but thinner than the thickness of the substrate 2, it is possible to achieve both of the improvement of the compressive strength of the inorganic layer 3 and the reduction in the thickness of the load sensor element 1.

In addition, in a case in which the inorganic layer 3 is made of the alumina protection film, similarly to the manufacturing method described in the above-mentioned embodiment, the manufacturing method of the load sensor element 1 provided with the inorganic layer 3 made of the alumina protection film includes Steps S1 to S8. However, the load sensor element plate 11 having the plurality of cell elements 12 provided with the pair of electrodes 5 (5a and 5b) is formed by, in Step S7, laying, by the vacuum process such as the vapor deposition, the sputtering, and so forth on the covered portion 21 of the substrate 2, an inorganic film layer serving as the inorganic layer body, in which the plurality of inorganic layers 3 corresponding to the number of the main body portions 41 are formed in a continuous manner, such that the plurality of main body portions 41 are covered in such a manner that the inorganic film layer is separated away from the electrodes 5.

Second Embodiment

In the following, the load sensor element 1 according to a second embodiment will be described with reference to FIG. 12. In the second embodiment, the description of the configurations that are the same as those in the above-described first embodiment is omitted, and the differences with respect to the above-described first embodiment will be mainly described.

Figure 12:
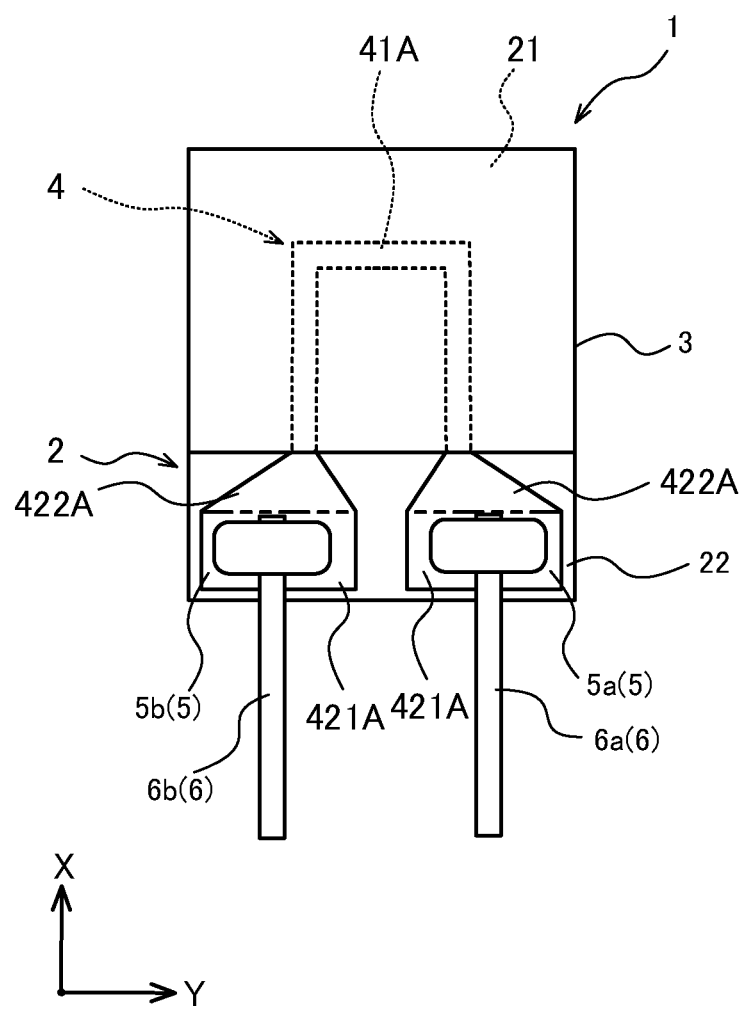
FIG. 12 is a plan view showing the load sensor element according to a second embodiment.

FIG. 12 is a plan view showing the load sensor element according to the second embodiment.

In the above-described first embodiment, although the main body portion 41 of the thin-layer resistance body 4 is formed to have the meandering pattern, the present disclosure is not limited thereto, and for example, as illustrated in the second embodiment, the main body portion 41 may be formed of a U-shaped patterned portion 41A (see FIG. 12) or a V-shaped patterned portion (not shown).

As shown in FIG. 12, similarly to the main body portion 41 formed to have the above-described meandering pattern, the main body portion 41A formed to have the U-shaped pattern is connected to electrode connecting portions 421A via tapered portions 422A each serving as the connecting portion. The main body portion 41A is mounted at the center of the covered portion 21 on the upper surface of the substrate 2. With such a configuration, even if the substrate 2 is used in a state in which it is curved towards the center, the load is applied to the main body portion 41A, and so, it is possible to detect the load with high accuracy.

Modification of Second Embodiment

Figure 13:
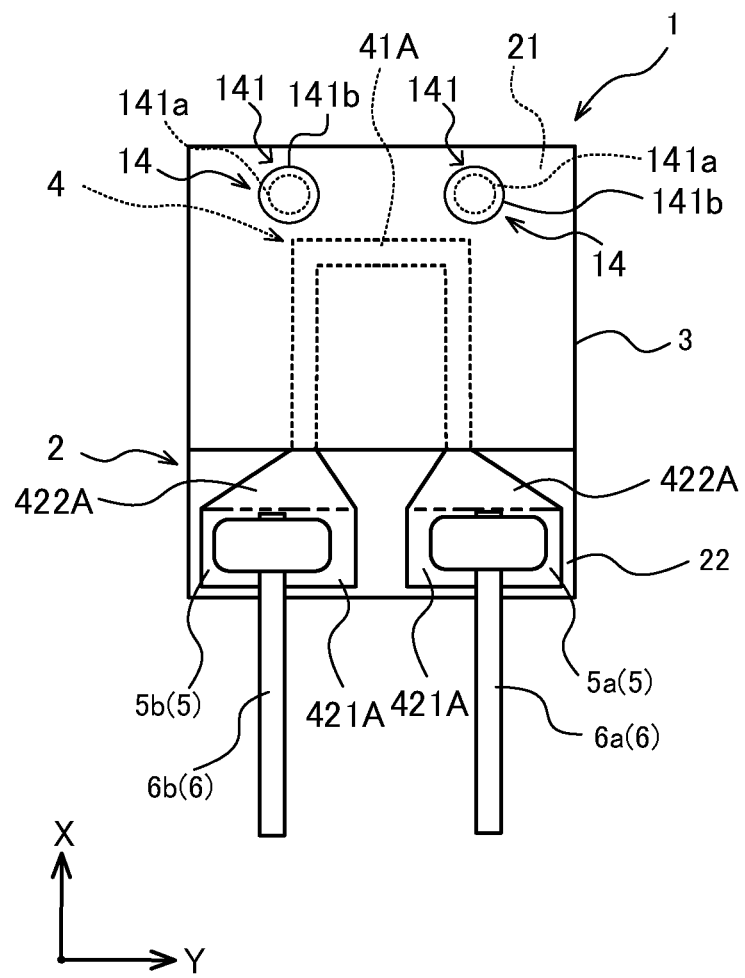
FIG. 13 is a plan view showing the load sensor element according to a modification of the second embodiment.

In the above-described second embodiment, although the load sensor element 1 is not provided with a positioning part, the present disclosure is not limited thereto, and for example, as in a modification shown in FIG. 13, positioning parts 14 with which the load sensor element 1 is positioned may be provided. FIG. 13 is a plan view showing the load sensor element 1 according to the one modification of the second embodiment.

As shown in FIG. 13, the positioning parts 14 are provided so as not to interfere with the U-shape patterned portion 41A serving as the main body portion. The positioning parts 14 are formed of two positioning pins 141. Each of the positioning pins 141 has a columnar penetrating portion 141a that penetrates through a circular through hole formed through the substrate 2 and the inorganic layer 3; and a head portion 141b that is provided on one end of the penetrating portion 141a. The head portion 141b is formed coaxially with the penetrating portion 141a such that the outer diameter of which is larger than the outer diameter of the penetrating portion 141a.

With such a configuration, because the load sensor element 1 can be assembled at a specified position only by using the positioning parts 14, the accuracy of positioning is improved, and a positional displacement of the load sensor element 1 after the assembly is less likely to be caused, and therefore, the detection accuracy of the load sensor element 1 is improved.

In this modification, although the positioning parts 14 are formed of two positioning pins 141, the present disclosure is not limited thereto, and for example, the positioning parts 14 may be formed of two screws.

In addition, in this modification, although the positioning parts 14 penetrate through the through holes formed in the substrate 2 and the inorganic layer 3, the present disclosure is not limited thereto, and for example, a notch or a groove that engages with the positioning part 14 may be formed instead of the through hole. In this case, it suffices to form the notch or the groove in at least one of the substrate 2 and the inorganic layer 3.

Third Embodiment

In the following, the load sensor element 1 according to a third embodiment will be described with reference to FIGS. 14A and 14B. In the third embodiment, the description of the configurations that are the same as those in the above-described first embodiment is omitted, and the differences with respect to the above-described first embodiment will be mainly described.

Figure 14A:
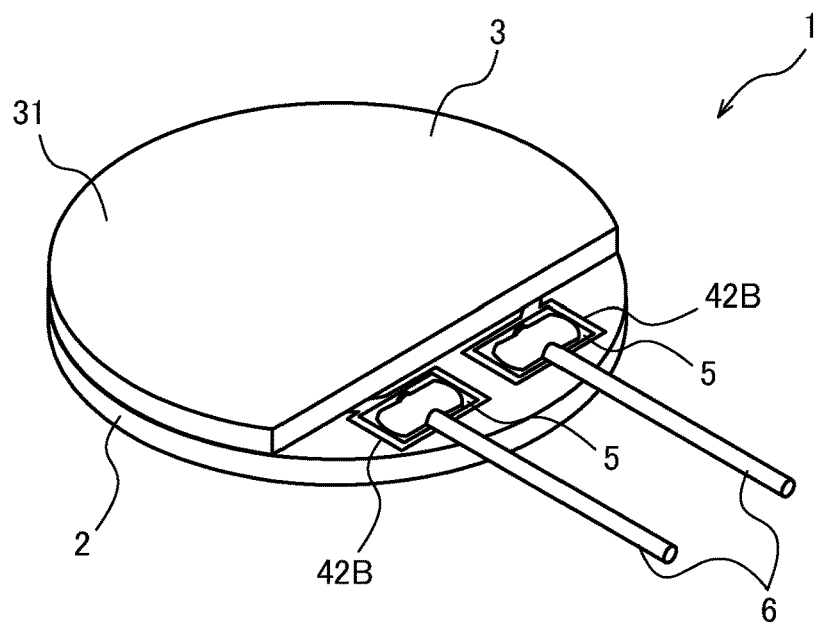
FIG. 14A is a perspective view showing the load sensor element according to a third embodiment.

FIG. 14A is a perspective view showing the load sensor element 1 according to the third embodiment. FIG. 14B is an exploded perspective view showing the load sensor element 1 according to the third embodiment.

Figure 14B:
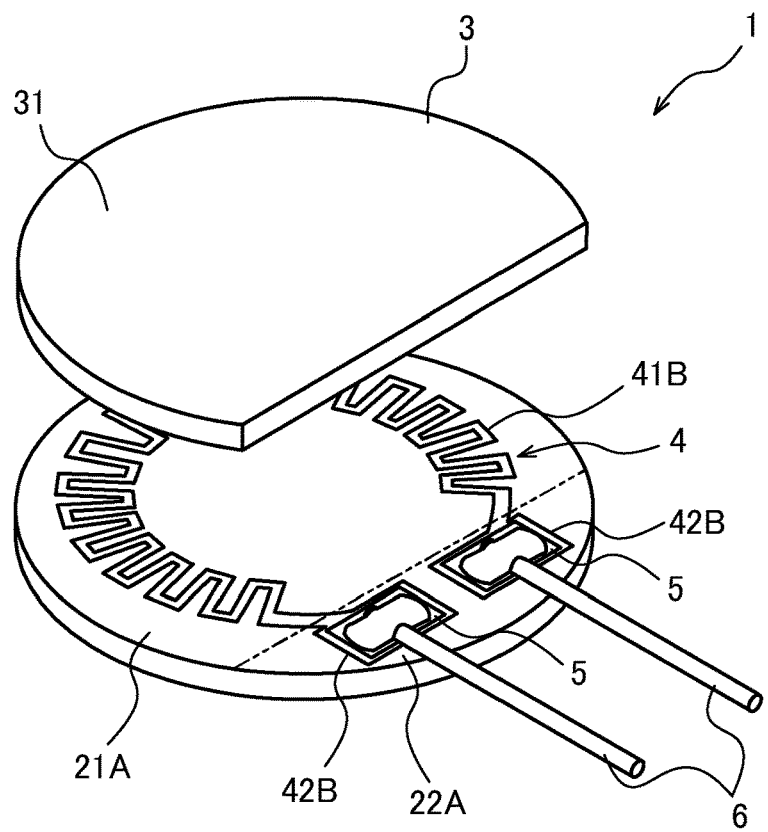
FIG. 14B is an exploded perspective view showing the load sensor element according to the third embodiment.

In the above-described first embodiment, although both of the substrate 2 and the inorganic layer 3 are formed to have the rectangular shape, the present disclosure is not limited thereto, and for example, as shown in FIGS. 14A and 14B, the substrate 2 may be formed to have a circular shape, and the inorganic layer 3 is formed to have a notched circle shape. The notched circle shape includes a segment shape, a semicircular shape, a D-cut shape (see FIGS. 14A and 14B), and so forth.

As shown in FIGS. 14A and 14B, in this embodiment, the circular upper surface of the substrate 2: has a covered portion 21A having the D-cut shape that is covered with the inorganic layer 3; and an exposed portion 22A having the segment shape that is not covered with the inorganic layer 3. The covered portion 21A having the D-cut shape is provided with a main body portion 41B of the thin-layer resistance body 4. The exposed portion 22A having the segment shape is provided with the pair of electrodes 5 via both end portions 42B of the thin-layer resistance body 4.

The main body portion 41B is formed to have an arc-shaped meandering pattern extending along an arc shape centered at the center of the circle of the substrate 2. In other words, the main body portion 41B is formed to have the arc-shaped meandering pattern that follows the external contour of the substrate 2. The main body portion 41B is provided such that the one end thereof is connected to the one side of the both end portions 42B and the other end of the main body portion 41B is connected to the other side of the both end portions 42B.

According to such a configuration, because the load to be applied to the pressure receiving surface 31 of the inorganic layer 3 is less likely to be distributed unevenly and is likely to be distributed more uniformly over the main body portion 41B, and therefore, the load sensor element 1 can detect the load with high accuracy.

Modification of Third Embodiment

In the above-described third embodiment, although the main body portion 41B is formed of the arc-shaped meandering patterned portion, the present disclosure is not limited thereto, and for example, the main body portion 41B may also be formed of a simple arc-shaped patterned portion.

Figure 15:
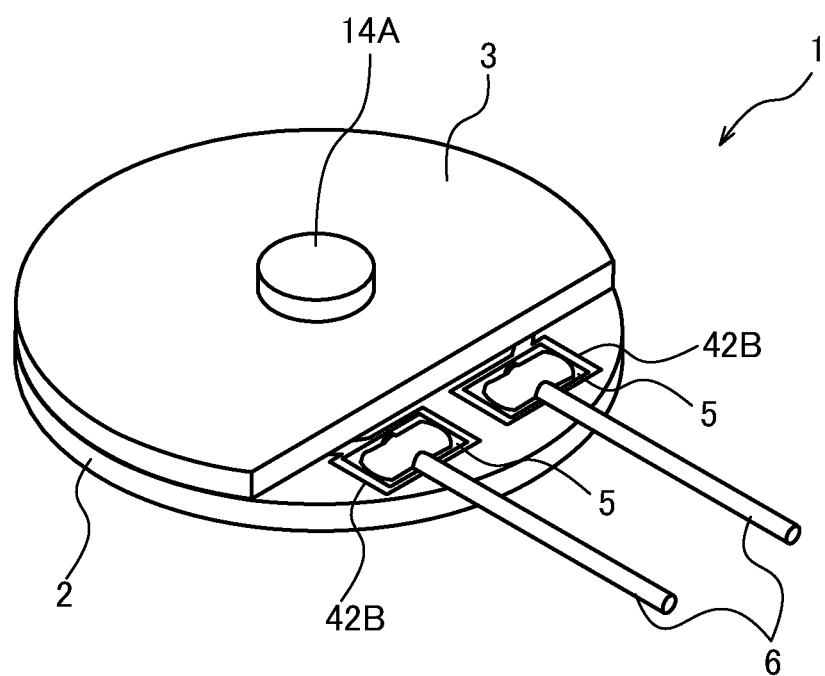
FIG. 15 is a perspective view showing the load sensor element according to another modification of the third embodiment.

In addition, in the above-described third embodiment, although the load sensor element 1 is not provided with the positioning parts, the present disclosure is not limited thereto, and for example, as in the other modification shown in FIG. 15, the load sensor element 1 may be provided with a positioning part 14A for positioning the load sensor element 1. FIG. 15 is a perspective view showing the load sensor element 1 according to the other modification of the third embodiment.

As shown in FIG. 15, the positioning part 14A is provided so as not to interfere with the meandering patterned portion serving as the main body portion 41B. The positioning part 14A is formed of a single positioning pin surrounded by the main body portion 41B (see FIG. 14B) having the meandering pattern.

With such a configuration, because it is possible to assemble the load sensor element 1 at a specified position only by using the positioning part 14A, the accuracy of the positioning is improved, and a positional displacement of the load sensor element 1 after the assembly is less likely to be caused, and therefore, the detection accuracy of the load sensor element 1 is improved.

In this modification, although the positioning part 14A is formed of the single positioning pin, the present disclosure is not limited thereto, and for example, the positioning part 14A may also be formed of a single screw.

In addition, in this modification, although the positioning part 14A penetrates through the through hole formed in the substrate 2 and the inorganic layer 3, the present disclosure is not limited thereto, and for example, the notch or the groove that engages with the positioning part 14A may also be provided instead of the through hole. In this case, it suffices that the notch or the groove is formed in at least one of the substrate 2 and the inorganic layer 3.

Although the present embodiment has been described in the above, the above-described embodiments merely illustrate a part of application examples of the present disclosure, and the technical scope of the present disclosure is not intended to be limited to the specific configurations of the above-described embodiments.

The invention claimed is:

1. A load sensor element configured to detect a load, the load sensor element comprising:
    a substrate made of a ceramic material or a metal material, the metal material having an insulating layer on its surface;
    an inorganic layer having a pressure receiving surface configured to receive the load, the inorganic layer being provided so as to cover a part of a single surface of the substrate;
    a thin-layer resistance body formed of a resistance body whose resistance value is changed in accordance with the load received by the inorganic layer, the thin-layer resistance body having a main body portion and both end portions, the main body portion being sandwiched between the substrate and the inorganic layer, the both end portions being mounted on an exposed portion of the substrate, and the exposed portion of the substrate being not covered with the inorganic layer; and a pair of electrodes electrically connected to the both end portions of the thin-layer resistance body so as to be separated away from the inorganic layer, the electrodes being provided on one side of the substrate, wherein the inorganic layer is made of a ceramic substrate, and a thickness of the inorganic layer is from 0.3 mm to 5.0 mm, inclusive.

2. The load sensor element according to claim 1, wherein the inorganic layer is made of the ceramic substrate, the inorganic layer being provided on the main body portion via a bonding layer.

3. The load sensor element according to claim 1, wherein a thickness of the substrate is from 0.3 mm to 5.0 mm, inclusive.

4. The load sensor element according to claim 1, wherein the thin-layer resistance body is made of a NiCr material or a Cr material.

5. The load sensor element according to claim 1, wherein a thickness of the thin-layer resistance body is greater than 0 and 1 µm or less.

6. The load sensor element according to claim 1, wherein the main body portion is formed of a meandering patterned portion.

7. The load sensor element according to claim 6, wherein the both end portions have: electrode connecting portions on which the pair of electrodes are respectively provided; and connecting portions configured to connect the meandering patterned portion with the electrode connecting portions.

8. The load sensor element according to claim 1, wherein both of the substrate and the inorganic layer have a rectangular shape.

9. The load sensor element according to claim 1, wherein the substrate has a circular shape, and the main body portion is formed of an arc-shaped meandering patterned portion or an arc-shaped patterned portion following an external contour of the substrate.

10. The load sensor element according to claim 1, further comprising:

a positioning part provided so as not to interfere with the main body portion, the positioning part being configured to position the load sensor element.

11. A manufacturing method of a load sensor element according to claim 1, the manufacturing method comprising:

a step of preparing a substrate layer made of a ceramic material or a metal material, the metal material having an insulating layer on its surface;

a step of laying a thin-layer resistivity layer on the substrate layer and laying an electrode layer on the thin-layer resistivity layer;

a step of forming a plurality of electrodes by performing a patterning of the electrode layer;

a step of forming a plurality of thin-layer resistance bodies by performing a patterning of the thin-layer resistivity layer, the thin-layer resistance bodies having main body portion and both end portions on which the pair of electrodes are to be respectively mounted;

a step of forming a load sensor element plate by laying an inorganic layer body such that the plurality of main body portions are covered in such a manner that the inorganic layer body is separated away from the electrodes, the load sensor element plate having a plurality of cell elements on which the pair of electrodes are provided, and the inorganic layer body being formed of a plurality of continuous inorganic layers corresponding to a number of the main body portions; and a step of splitting the load sensor element plate into the plurality of cell elements.

* * * * *